United States Patent
Oogaki

(10) Patent No.: US 7,704,904 B2
(45) Date of Patent: Apr. 27, 2010

(54) OPTICAL GLASS AND OPTICAL ELEMENT

(75) Inventor: Akio Oogaki, Itami (JP)

(73) Assignee: Konica Minolta Opto, Inc., Hachioji-shi (JP)

( * ) Notice: Subject to any disclaimer, the term of this patent is extended or adjusted under 35 U.S.C. 154(b) by 269 days.

(21) Appl. No.: 12/009,814

(22) Filed: Jan. 22, 2008

(65) Prior Publication Data

US 2008/0176734 A1     Jul. 24, 2008

(30) Foreign Application Priority Data

Jan. 24, 2007  (JP)  .............................. 2007-013429

(51) Int. Cl.
  C03C 3/15    (2006.01)
  C03C 3/155   (2006.01)
  C03C 3/066   (2006.01)
  C03C 3/068   (2006.01)

(52) U.S. Cl. .............................. 501/50; 501/51; 501/78; 501/79

(58) Field of Classification Search .................. 501/50, 501/51, 78, 79
See application file for complete search history.

(56) References Cited

U.S. PATENT DOCUMENTS

| 6,251,813 B1 | 6/2001 | Sato ............................. 501/78 |
| 6,713,419 B1 | 3/2004 | Onozawa et al. .............. 501/78 |

FOREIGN PATENT DOCUMENTS

| JP | 2000016831  | * | 1/2000 |
| JP | 2001-130924 A |   | 5/2001 |
| JP | 2001130924  | * | 5/2001 |
| WO | 2004087596  | * | 10/2004 |

* cited by examiner

*Primary Examiner*—Karl E Group
(74) *Attorney, Agent, or Firm*—Sidley Austin LLP

(57) ABSTRACT

An optical glass contains as glass ingredients, by weight: 0-8% $SiO_2$; 34.5-46% $B_2O_3$; 2.6-6% $Li_2O$; 21-38% ZnO; 0-40% $La_2O_3$; 0-35% $Gd_2O_3$; and 0-15% $Y_2O_3$, with the total content of $La_2O_3+Gd_2O_3+Y_2O_3$ accounting for 10-40%. The optical glass also has a predetermined index of refraction and a predetermined dispersion.

9 Claims, 1 Drawing Sheet

OPTICAL GLASS AND OPTICAL ELEMENT

This application is based on Japanese Patent Application No. 2007-013429 filed on Jan. 24, 2007, the contents of which are hereby incorporated by reference.

BACKGROUND OF THE INVENTION

1. Field of the Invention

The present invention relates to an optical glass and to an optical elements formed thereof. More particularly, the invention relates to an optical glass suitable for mold-pressing and to an optical element formed of such an optical glass.

2. Description of Related Art

One method of fabricating an optical element such as a glass lens is so-called mold-pressing. In mold-pressing, a lens is directly molded by pressing glass heated to above the yielding temperature thereof (hereinafter also represented by "At") between a pair of heated metal molds—an upper and a lower mold. This involves less fabrication steps than other conventional methods of molding lenses which involve the grinding and polishing of glass, and thus permits fabrication of lenses with less time and at lower costs. Mold-pressing has therefore come to be widely employed in recent years to fabricate optical elements such as glass lenses.

There are mainly two types of mold-pressing: one involving reheating and the other involving direct-pressing. In mold-pressing of the reheating type, a gob preform or a polished preform having largely the shape of the finished product is prepared, and this preform is then reheated to above the softening point and press-molded between a pair of heated metal molds—an upper and a lower mold—so as to be formed into the shape of the finished product. On the other hand, in mold-pressing of the direct-pressing type, molten glass from a glass melting furnace is poured directly into a heated metal mold and is press-molded so as to be formed into the shape of the finished product.

In mold-pressing of either type, when glass is molded, the pressing metal mold needs to be heated to near or above the glass transition temperature (hereinafter also represented by "Tg"). As a result, the higher the Tg of glass, the more prone the pressing metal mold is to surface oxidation and to alteration in the metal composition, and thus the shorter the useful life of the pressing metal mold, resulting in higher fabrication costs. Deterioration of the metal mold may be alleviated by performing molding in an atmosphere of an inert gas such as nitrogen. The control of the atmosphere, however, requires a complicated design in molding equipment, and the use of the inert gas incurs a running cost, leading to higher fabrication costs. Thus, it is desirable that glass used in mold-pressing have as low a Tg as possible. On the other hand, during mold-pressing, and during the cooling of the molded product, if the glass has a high linear expansion coefficient in the temperature range of 100-300° C., thermal stress is so great that the molded product is prone to cracking and chipping. In particular, in mold-pressing of the direct-pressing type, which involves rapid cooling of the molded product, the molded product frequently develops cracks. Thus, to prevent cracking and chipping of the molded product, it is desirable that grass have a low linear expansion coefficient.

Against this background, various technologies for lowering the Tg of glass have been studied, of which examples are proposed in U.S. Pat. No. 6,713,419, in U.S. Pat. No. 6,251,813, and in JP-A-2001-130924.

Some of the optical glasses proposed in the patent documents mentioned above do have low Tg's but have, disappointingly, high linear expansion coefficients, causing cracking and chipping in the molded product during mold-pressing and during the cooling of the molded product.

SUMMARY OF THE INVENTION

The present invention has been devised to address the inconveniences mentioned above, and it is an object of the invention to provide an optical glass that has a low Tg and a low linear expansion coefficient and that is thus suitable for mold-pressing, and to provide an optical element formed of such an optical glass.

To achieve the above object, the inventor has made intensive studies and found out that it is possible to give an optical glass a low Tg and a low linear expansion coefficient suitable for mold-pressing by adopting a basic composition containing $B_2O_3$, $Li_2O$, ZnO, and $Ln_2O_3$ (where Ln is one or more selected from the elements La, Gd, and Y) and controlling the contents of different optical glass ingredients within predetermined ranges. This finding has led to the present invention.

Specifically, according to one aspect of the invention, an optical glass contains as glass ingredients, by weight: 0-8% $SiO_2$; 34.5-46% $B_2O_3$; 2.6-6% $Li_2O$; 21-38% ZnO; 0-40% $La_2O_3$; 0-35% $Gd_2O_3$; and 0-15% $Y_2O_3$, with the total content of $La_2O_3+Gd_2O_3+Y_2O_3$ accounting for 10-40%. The optical glass may further contain as glass ingredients, by weight: 0-1% $Na_2O$; 0-1% $K_2O$; 0-5% MgO; 0-8% CaO; 0-10% SrO; 0-10% BaO; 0-5% $TiO_2$; 0-5% $ZrO_2$; 0-6% $Nb_2O_5$; 0-10% $Ta_2O_5$ (zero inclusive); 0-10% $WO_3$; 0-1% $Sb_2O_3$; and 0-3% $Bi_2O_3$. The optical glass may have an index of refraction (nd) and an Abbe number (vd) in the range confined by coordinates (1.730, 52.0), (1.680, 55.0), (1.680, 50.0), and (1.730, 50.0) in a diagram showing the distribution of the indices of refraction (nd) and the Abbe numbers (vd) of different optical glasses in the form of coordinates (nd, vd). The optical glass may have a glass transition temperature (Tg) of 520° C. or less, and a linear expansion coefficient ($\alpha$) of $80\times10^{-7}$/K or less in the temperature range of 100-300° C. In the following description, all percentage (%) values are in percent (%) by weight, unless otherwise stated.

According to another aspect of the invention, an optical element is formed of, or formed by mold-pressing, an optical glass as described above. Preferred examples of optical elements so formed are lenses, prisms, and mirrors.

Thus, according to the present invention, an optical glass is given predetermined contents of glass ingredients like $B_2O_3$, $Li_2O$, ZnO, and $Ln_2O_3$ (where Ln is one or more selected from the elements La, Gd, and Y) so as to have predetermined optical constants, such as index of refraction and dispersion, and offer a low linear expansion coefficient. This helps reduce cracking and chipping in the molded product during the cooling of the glass, and in addition the low Tg offers excellent suitability for mold-pressing.

DETAILED DESCRIPTION OF PREFERRED EMBODIMENTS

Figure 1:
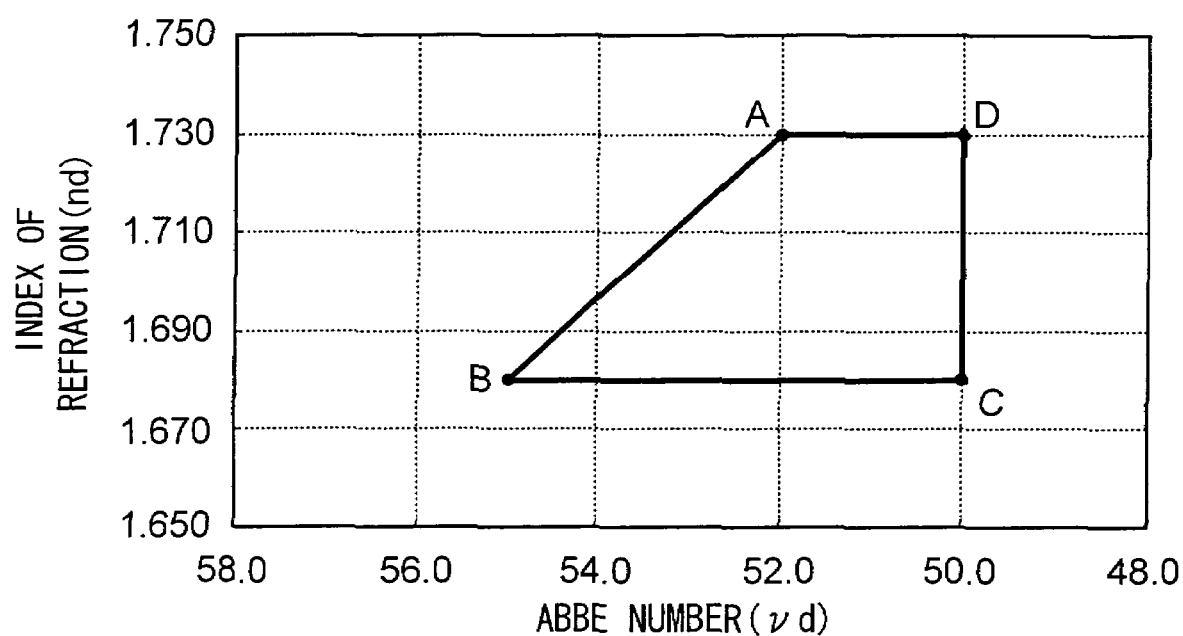
FIG. 1 is a diagram showing the distribution of the indices of refraction (nd) and the Abbe numbers (vd) of optical glasses according to the invention.

The grounds on which the contents of different ingredients are controlled in different compositions of optical glasses according to the invention will be described below.

$SiO_2$ is the oxide that forms glass, and is an ingredient effective in enhancing chemical durability. A $SiO_2$ content over 8%, however, results in a high glass transition temperature (Tg). Hence, the $SiO_2$ content is controlled to be 8% or less.

$B_2O_3$ is one of the basic ingredients of an optical glass according to the invention. A $B_2O_3$ content of 34.5% or more gives a linear expansion coefficient ($\alpha$) of $80\times10^{-7}$/K or less in the temperature range of 100-300° C.; however, a $B_2O_3$ content over 46% results in an index of refraction lower than an expected range, and also results in low chemical durability. Hence, the $B_2O_3$ content is controlled to be in the range of 34.5-46%. A more preferred content of $B_2O_3$ is in the range of 35-43%.

$Li_2O$ is another of the basic ingredients of an optical glass according to the invention, and has the effect of lowering Tg. A $Li_2O$ content under 2.6% makes it difficult to obtain a low Tg; on the other hand, a $Li_2O$ content over 6% results in a linear expansion coefficient ($\alpha$) higher than $80\times10^{-7}$/K in the temperature range of 100-300° C. Hence, the $Li_2O$ content is controlled to be in the range of 2.6-6%. A more preferred content of $Li_2O$ is in the range of 3-5.5%.

ZnO is yet another of the basic ingredients of an optical glass according to the invention. A ZnO content of 21% or more gives a low Tg combined with a low linear expansion coefficient ($\alpha$); however, a ZnO content over 38% tends to make the glass opaque. Hence, the ZnO content is controlled to be in the range of 21-38%. A more preferred content of ZnO is in the range of 22-28%.

$La_2O_3$, $Gd_2O_3$, and $Y_2O_3$ have the effect of increasing the index of refraction. Controlling the total content of $La_2O_3$, $Gd_2O_3$, and $Y_2O_3$ in the range of 10-40% gives an index of refraction aimed at in the invention. A $La_2O_3$ content over 40% tends to make the glass opaque; likewise, a $Gd_2O_3$ content over 35%, or a $Y_2O_3$ content over 15%, tends to make the glass opaque. Hence, the total content of $La_2O_3$, $Gd_2O_3$, and $Y_2O_3$ is controlled to be in the range of 10-40%, with the $La_2O_3$ content 40% or less, the $Gd_2O_3$ content 35% or less, and the $Y_2O_3$ content 15% or less.

$Na_2O$ and $K_2O$ have the effect of lowering the glass transition temperature (Tg). A $Na_2O$ content over 1%, or a $K_2O$ content over 1%, results in a low index of refraction. Hence, the $Na_2O$ content and the $K_2O$ content are each controlled to be 1% or less.

MgO has the effect of adjusting the index of refraction of the glass. A MgO content over 5%, however, tends to make the glass opaque. Hence, the MgO content is controlled to be 5% or less.

CaO has the effect of adjusting the index of refraction of the glass. A CaO content over 8%, however, makes it difficult to obtain a linear expansion coefficient ($\alpha$) of $80\times10^{-7}$/K or less in the temperature range of 100-300° C. Hence, the CaO content is controlled to be 8% or less.

SrO and BaO have the effect of adjusting the index of refraction of the glass. A SrO content over 10%, or a BaO content over 10%, however, makes it difficult to obtain a linear expansion coefficient ($\alpha$) of $80\times10^{-7}$/K or less in the temperature range of 100-300° C. Hence, the SrO content and the BaO content are each controlled to be 10% or less.

$TiO_2$ has the effect of increasing the index of refraction of the glass. A $TiO_2$ content over 5%, however, makes it difficult to obtain an Abbe number of 50 or more. Hence, the $TiO_2$ content is controlled to be 5% or less.

$ZrO_2$ has the effect of increasing the index of refraction of the glass. A $ZrO_2$ content over 5%, however, tends to make the glass opaque. Hence, the $ZrO_2$ content is controlled to be 5% or less.

$Nb_2O_5$ has the effect of increasing the index of refraction of the glass. A $Nb_2O_5$ content over 6%, however, makes it difficult to obtain an Abbe number of 50 or more. Hence, the $Nb_2O_5$ content is controlled to be 6% or less.

$Ta_2O_5$ and $WO_3$ have the effect of increasing the index of refraction of the glass. A $Ta_2O_5$ content over 10%, or a $WO_3$ content over 10%, however, makes it difficult to obtain an Abbe number of 50 or more. Hence, the $Ta_2O_5$ content and the $WO_3$ content are each controlled to be 10% or less.

$Sb_2O_3$ has the effect of removing bubbles in the lens, and exerts that effect when its content is 1% or less. $Bi_2O_3$ has the effects of increasing the index of refraction and lowering Tg. A $Bi_2O_3$ content over 3%, however, tends to tint the glass. Hence, the $Bi_2O_3$ content is controlled to be 3% or less. An optical glass according to the invention may contain any ingredient other than those specifically described above.

Controlling the contents of different ingredients in a composition of an optical glass as described above makes the optical glass suitable for mold-pressing and gives it a predetermined index of refraction and a predetermined Abbe number as shown in FIG. 1. FIG. 1 is a diagram showing the distribution of the indices of refraction (nd) and the Abbe numbers (vd) of optical glasses, with the vertical axis representing the index of refraction (nd) and the horizontal axis representing the Abbe number (vd). When the index of refraction and the Abbe number of an optical glass are expressed in the form of coordinates (nd, vd) in FIG. 1, then optical glasses of compositions containing different ingredients controlled in the ranges according to the invention find their indices of refraction the Abbe numbers in the range confined by point A (1.730, 52.0), point B (1.680, 55.0), point C (1.680, 50.0), and point D (1.730, 50.0).

An optical element according to the invention is fabricated by mold-pressing an optical glass according to the invention as described above. The mold-pressing employed here may be, for example, mold-pressing of the direct-pressing type, in which molten glass is poured from a nozzle into a metal mold heated to a predetermined temperature to achieve press-molding, or mold-pressing of the reheating type, in which a preform placed on a metal mold is heated to above the glass softening point to achieve press-molding. Any of these and like methods eliminates the need for grinding and polishing, helps enhance productivity, and makes it possible to fabricate optical elements having difficult-to-work shapes such as freeform curved surfaces and aspherical surfaces.

Desirable molding conditions differ depending on the ingredients of glass and the shape of the molded product. Generally, a preferred temperature of the metal mold is in the range of 350-600° C., more preferably in a temperature range close to the glass transition temperature. A preferred pressing duration is in the range of several seconds to several tens of seconds. A preferred pressing pressure is in the range of 200-600 kgf/cm², varying according to the shape and size of the molded product such as a lens. The higher the pressure of pressing, the higher the accuracy of molding Optical elements according to the invention find uses as, for example, lenses in digital cameras; collimator lenses, prisms, and mirrors in laser beam printers; and the like.

EXAMPLES

Hereinafter, the invention will be described more specifically by way of practical examples. These examples, however, are not meant to limit the invention in any way.

For each example, source materials in powder form—carbonates, nitrates, oxides, etc.—were well mixed, and were then put in a melting furnace heated to 1000-1300° C. There, the mixture was melted, fined down, and agitated to be homogenized. The melt was then poured into a preheated metal casting mold, and was then gradually cooled down to room temperature. Thus, the optical glass of each example was obtained. The compositions and measurement results of 20 practical examples so produced are shown in Tables 1 and 2.

Tables 1 and 2 show the composition of each practical example (Practical Examples 1 to 20), and also show, in a bottom part thereof, with respect to the optical glass of each practical example, the index of refraction (nd) for the d-line and the Abbe number (vd), the glass transition temperature (Tg), the yielding temperature (At), and the linear expansion coefficient ($\alpha$) in $10^{-7}$/K in the temperature range of 100-300° C. For comparison, Table 3 shows the compositions and measurement results—like those shown in Tables 1 and 2—of three comparative examples (Comparative Examples 1 to 3), which are Example 7 of U.S. Pat. No. 6,713,419, Example 6 of U.S. Pat. No. 6,251,813, and Example 4 of JP-A-2001-130924, respectively.

The above-mentioned properties of glass were measured according to the Japan Optical Glass Industry Standard (JO-GIS). The index of refraction (nd) and the Abbe number (vd) were measured using a "KPR-200" precision refractometer manufactured by Kalnew Kogaku Kogyo Co. Ltd.) after glass was gradually cooled to room temperature at a rate of −20° C. per hour from the temperature it had when its melt was poured into the casting mold. The glass transition temperature (Tg), the yielding temperature (At), and the linear expansion coefficient ($\alpha$) were measured using a "TMA/SS6000" thermomechanical analyzer (manufactured by Seiko Instruments Inc.) while the temperature of glass was raised at a rate of 10° C. per minute.

As will be clear from Tables 1 and 2, the optical glasses of Practical Examples 1 to 20 have indices of refraction (nd) in the range of 1.6811 to 1.721 and Abbe numbers (vd) in the range of 50.1 to 54.7; that is, they have indices of refraction (nd) and Abbe numbers (vd) in the range confined by points A to D in FIG. 1. Moreover, they have glass transition temperatures (Tg) of 519° C. or less, yielding temperatures (At) of 571° C. or less, and linear expansion coefficients of $80 \times 10^{-7}$/K or less, proving to be suitable for mold-pressing.

By contrast, the optical glasses of Comparative Examples 1 to 3 all have so high linear expansion coefficients that they are not suitable for mold-pressing.

TABLE 1

| Practical Example | 1 | 2 | 3 | 4 | 5 | 6 | 7 | 8 | 9 | 10 |
|---|---|---|---|---|---|---|---|---|---|---|
| $SiO_2$ | | | | | | | | | | 7.2 |
| $B_2O_3$ | 42.5 | 35.5 | 36.9 | 35 | 35.7 | 34.6 | 38.7 | 37.5 | 37.7 | 35.2 |
| $Li_2O$ | 3 | 3 | 3 | 2.8 | 2.8 | 2.6 | 4.5 | 3 | 2.8 | 4.1 |
| ZnO | 25.2 | 30.2 | 26.9 | 36.4 | 24.7 | 22.8 | 23.6 | 28.7 | 24.9 | 21 |
| $La_2O_3$ | 21.8 | | 8 | 19.8 | 26.8 | 39.6 | 18.5 | 22.4 | 25.3 | 27.5 |
| $Gd_2O_3$ | 6 | 31.3 | 25.2 | 6 | 10 | 0.4 | 7.2 | 5.9 | 6.2 | 2.5 |
| $Y_2O_3$ | 1.5 | | | | | | 7.5 | 1 | | |
| $TiO_2$ | | | | | | | | | | |
| $ZrO_2$ | | | | | | | | | | 1.5 |
| $Nb_2O_5$ | | | | | | | | | | 1 |
| $Ta_2O_5$ | | | | | | | | | | |
| $WO_3$ | | | | | | | | | | |
| MgO | | | | | | | | | | |
| CaO | | | | | | | | | 1.5 | 3.1 |
| SrO | | | | | | | | | | |
| BaO | | | | | | | | | | |
| $Na_2O$ | | | | | | | | | | |
| $K_2O$ | | | | | | | | | | |
| $Bi_2O_3$ | | | | | | | | | | |
| $Sb_2O_3$ | | | | | | | | | | |
| Total | 100 | 100 | 100 | 100 | 100 | 100 | 100 | 100 | 100 | 100 |
| nd | 1.6811 | 1.6939 | 1.6945 | 1.701 | 1.7104 | 1.721 | 1.682 | 1.6982 | 1.701 | 1.6817 |
| vd | 54.7 | 52.7 | 53.1 | 51 | 52.5 | 52 | 53.7 | 52.8 | 53 | 52.9 |
| Tg | 516 | 512 | 515 | 487 | 514 | 518 | 510 | 494 | 509 | 517 |
| At | 569 | 560 | 563 | 535 | 562 | 566 | 555 | 546 | 552 | 563 |
| $\alpha$ | 74 | 75 | 78 | 77 | 79 | 80 | 78 | 78 | 79 | 79 |

TABLE 2

| Practical Example | 11 | 12 | 13 | 14 | 15 | 16 | 17 | 18 | 19 | 20 |
|---|---|---|---|---|---|---|---|---|---|---|
| $SiO_2$ | 1.2 | | 3 | | | | | | | |
| $B_2O_3$ | 34.7 | 42.6 | 38 | 40 | 45.6 | 37.7 | 42.1 | 39.8 | 40.4 | 38.5 |
| $Li_2O$ | 2.8 | 4.1 | 4 | 5 | 3.4 | 2.8 | 3.2 | 3 | 2.9 | 3 |
| ZnO | 31.1 | 21 | 21.5 | 30 | 25.2 | 25 | 28.9 | 23.9 | 24.6 | 25.4 |
| $La_2O_3$ | 11 | 19.9 | 18.5 | 14.9 | 17.4 | 16.2 | 17.2 | 21.8 | 20.9 | 24.1 |
| $Gd_2O_3$ | 10.1 | 9.8 | 10 | | 4.5 | 4.9 | 2.9 | 7.7 | 5.4 | |
| $Y_2O_3$ | | | 2 | | | | | 2.1 | 0.7 | 5.9 |
| $TiO_2$ | | 0.5 | | | 3.9 | | | | 0.8 | |
| $ZrO_2$ | | 1.6 | 2 | 5 | | | | | | |
| $Nb_2O_5$ | | 0.5 | 0.4 | | | | 5.7 | | | |
| $Ta_2O_5$ | | 0.2 | | 5.1 | | | | | | |
| $WO_3$ | | 0.3 | | | | 8.1 | | | | 2.1 |

TABLE 2-continued

| Practical Example | 11 | 12 | 13 | 14 | 15 | 16 | 17 | 18 | 19 | 20 |
|---|---|---|---|---|---|---|---|---|---|---|
| MgO | | | | | | | | | 2.2 | |
| CaO | | | | | | 5.3 | | | | |
| SrO | | | | | | | | | | 3 |
| BaO | 9.1 | | | | | | | | | |
| Na$_2$O | | | | | | | | 0.3 | | |
| K$_2$O | | | | | | | | 0.2 | | |
| Bi$_2$O$_3$ | | | | | | | | 1.2 | | |
| Sb$_2$O$_3$ | | | 0.1 | | | | | | | 0.1 |
| Total | 100 | 100 | 100 | 100 | 100 | 100 | 100 | 100 | 100 | 100 |
| nd | 1.6877 | 1.6817 | 1.6853 | 1.6864 | 1.6824 | 1.6912 | 1.6857 | 1.6905 | 1.6888 | 1.6956 |
| vd | 52.6 | 53.2 | 53.2 | 50.4 | 50.1 | 50.6 | 50.2 | 53 | 52.2 | 53.4 |
| Tg | 476 | 509 | 519 | 489 | 518 | 505 | 514 | 514 | 518 | 513 |
| At | 520 | 556 | 562 | 531 | 569 | 549 | 562 | 567 | 571 | 564 |
| α | 79 | 77 | 78 | 79 | 70 | 78 | 71 | 78 | 75 | 78 |

TABLE 3

| Comparative Example | 1 | 2 | 3 |
|---|---|---|---|
| SiO$_2$ | 15 | 6 | 9 |
| B$_2$O$_3$ | 23 | 33 | 34 |
| Li$_2$O | 3.5 | 3 | 6.8 |
| ZnO | 3 | 17 | 5 |
| La$_2$O$_3$ | 11 | 21 | 21 |
| Gd$_2$O$_3$ | 3 | 1 | |
| Y$_2$O$_3$ | 9 | 8 | 8 |
| TiO$_2$ | | | |
| ZrO$_2$ | 2.5 | | 5 |
| Nb$_2$O$_5$ | | | |
| Ta$_2$O$_5$ | 2.9 | | |
| WO$_3$ | | | |
| MgO | | 1 | |
| CaO | 12 | 10 | 9 |
| SrO | 3 | | 2 |
| BaO | 12 | | |
| Na$_2$O | | | |
| K$_2$O | | | |
| Bi$_2$O$_3$ | | | |
| Sb$_2$O$_3$ | 0.1 | | 0.2 |
| Total | 100 | 100 | 100 |
| nd | 1.687 | 1.6921 | 1.681 |
| vd | 53.7 | 53.6 | 53.7 |
| Tg | 530 | 518 | 498 |
| At | 585 | 568 | 549 |
| α | 100 | 90 | 100 |

What is claimed is:

1. An optical glass comprising as glass ingredients, by weight:
   0-8% SiO$_2$;
   34.5-46% B$_2$O$_3$;
   2.6-6% Li$_2$O;
   21-38% ZnO;
   0-40% La$_2$O$_3$;
   0-35% Gd$_2$O$_3$; and
   0-15% Y$_2$O$_3$,
   with a total content of La$_2$O$_3$+Gd$_2$O$_3$+Y$_2$O$_3$ accounting for 10-40%.

2. The optical glass of claim 1, further comprising as glass ingredients, by weight:
   0-1% Na$_2$O;
   0-1% K$_2$O;
   0-5% MgO;
   0-8% CaO;
   0-10% SrO;
   0-10% BaO;
   0-5% TiO$_2$;
   0-5% ZrO$_2$;
   0-6% Nb$_2$O$_5$;
   0-10% Ta$_2$O$_5$;
   0-10% WO$_3$;
   0-1% Sb$_2$O$_3$; and
   0-3% Bi$_2$O$_3$.

3. The optical glass of claim 1,
   wherein an index of refraction (nd) and an Abbe number (vd) of the optical glass lie in a range confined by coordinates (1.730, 52.0), (1.680, 55.0), (1.680, 50.0), and (1.730, 50.0) in a diagram showing a distribution of indices of refraction (nd) and Abbe numbers (vd) of different optical glasses in a form of coordinates (nd, vd).

4. The optical glass of claim 1,
   wherein the optical glass has
   a glass transition temperature (Tg) of 520° C. or less and a linear expansion coefficient (α) of $80 \times 10^{-7}$/K or less in a temperature range of 100-300° C.

5. The optical glass of claim 1,
   wherein the B$_2$O$_3$ content is in a range of 35-43%.

6. The optical glass of claim 1,
   wherein the Li$_2$O content is in a range of 3-5.5%.

7. The optical glass of claim 1,
   wherein the ZnO content is in a range of 22-28%.

8. An optical element formed of the optical glass of claim 1.

9. An optical element formed by mold-pressing the optical glass of claim 1.

* * * * *